United States Patent [19]
Schoennenbeck

[11] Patent Number: 5,378,200
[45] Date of Patent: Jan. 3, 1995

[54] CONE DISK TRANSMISSION

[75] Inventor: Gert Schoennenbeck, Bad Homburg, Germany

[73] Assignee: Reimers Getriebe AG, Zug, Switzerland

[21] Appl. No.: 141,926

[22] Filed: Oct. 28, 1993

[30] Foreign Application Priority Data

Oct. 28, 1992 [DE] Germany ............... 4236301

[51] Int. Cl.6 .......................... F16H 59/00
[52] U.S. Cl. ....................... 474/18; 474/28
[58] Field of Search ............. 474/8, 11, 12, 17, 18, 474/28, 69, 70

[56] References Cited

U.S. PATENT DOCUMENTS

| 4,702,725 | 10/1987 | Kouno et al. ............... 474/28 |
| 4,778,435 | 10/1988 | Sugaya et al. ............ 474/18 X |
| 5,169,365 | 12/1992 | Friedmann ................... 474/18 |

FOREIGN PATENT DOCUMENTS

| 3900204A1 | 7/1990 | Germany . |
| 403980C1 | 1/1992 | Germany . |

*Primary Examiner*—Michael Powell Buiz
*Attorney, Agent, or Firm*—Spencer, Frank & Schneider

[57] ABSTRACT

A cone disc transmission is presented which is infinitely adjustable and includes the production of axial pressure forces of the cone discs on pulling member rotating between these cone discs via hydraulic tensioning member. The tensioning member, which are arranged on the transmission shafts, each axially influence one of the cone discs which are displaceably arranged on the respective transmission shaft. By way of a control valve, the tensioning member and the pressure medium conduits connected thereto are charged by a pressure medium which is supplied by a pump. A torque disposed on the drive shaft of the transmission in the reflux of the control valve throttles the reflux of the pressure medium as a result of the torque-dependent movement of two valve members relative to one another and as a function of the load and thus determines the basic pressure of the system. A revolution sensor is provided on the drive shaft, which, as a function of the number of revolutions, provides pressure medium to a control element which, in connection with an adjustment member for drive power, acts upon the transmission ratio by way of the control valve. In this case, pressure medium conduits leading from the control valve to the tensioning member are connected to one another by a short-circuit conduit which is open only if the pump is at rest.

4 Claims, 1 Drawing Sheet

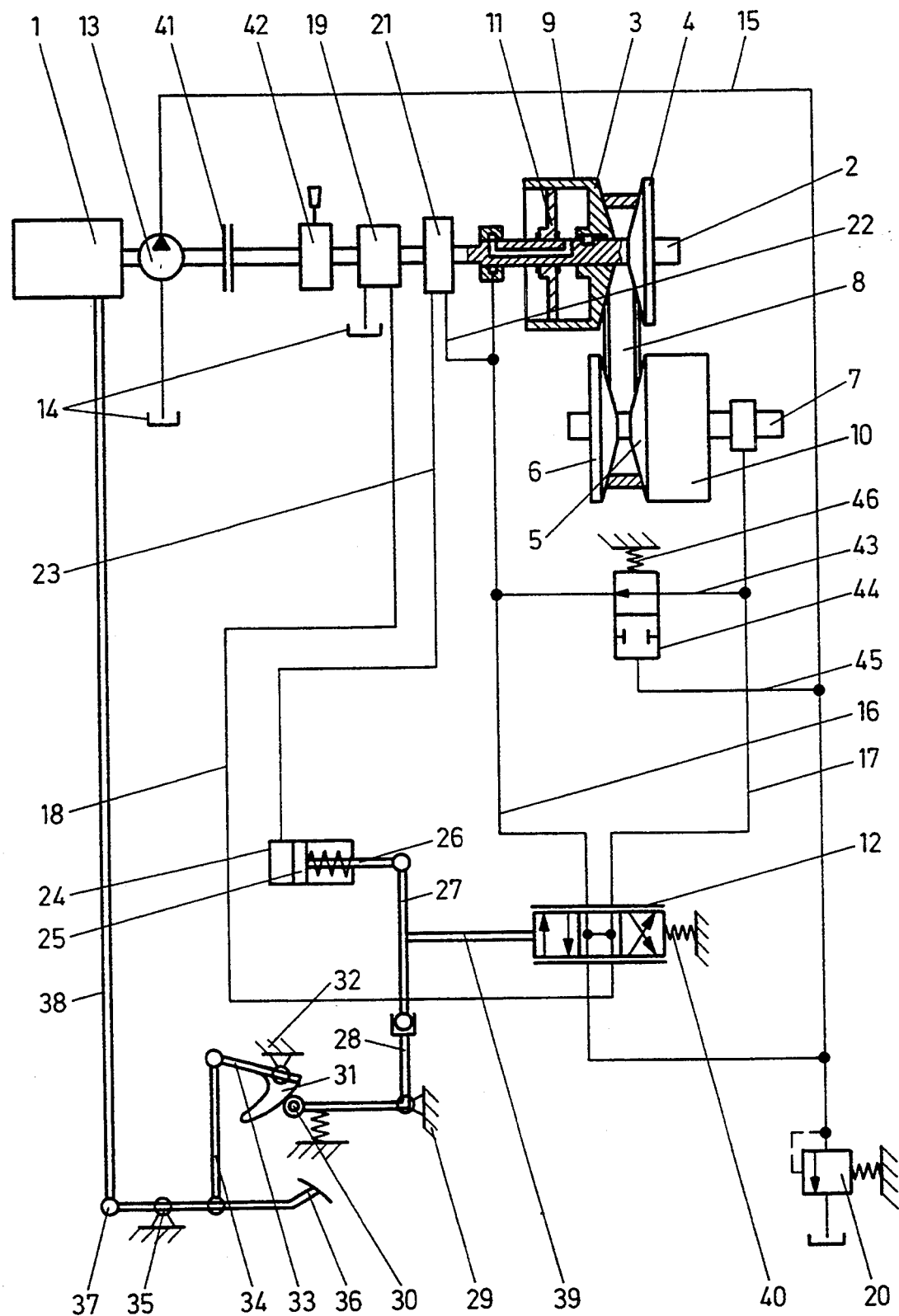

CONE DISK TRANSMISSION

CROSS REFERENCE TO RELATED APPLICATION

This application claims the priority of Pat. Application Serial No. DE P 4,236,301.2 filed Oct. 28th, 1992 in the Federal Republic of Germany, the subject matter of which is incorporated herein by reference.

BACKGROUND OF THE INVENTION

The present invention relates to an infinitely adjustable cone disc transmission and the production of axial pressure forces of the cone discs on pulling means rotating between these cone discs via hydraulic tensioning means, which are arranged on the transmission shafts and axially influence each of the cone discs which are displaceably arranged on the respective transmission shaft. The tensioning means and the pressure medium conduits contacting the same are charged with a pressure medium which is supplied by a pump. A torque sensor is provided in the reflux of the control valve on the drive shaft of the transmission. This torque sensor throttles, as a function of the load, the reflux of the pressure medium as a result of the movement of two valve members relative to one another as a function of the torque and thus determines the system's base pressure. A revolution sensor is provided on the drive shaft, so as to provide, as a function of the rotational speed, pressure medium to a control element which, in connection with a member for adjusting the drive power, acts upon the transmission ratio by way of the control valve.

This type of cone disc transmission is disclosed in DE 4,039,830. There, a pressurizing valve is additionally connected to the input of a torque sensor in order to throttle the reflux of the pressure medium as a function of the transmission ratio, such that the entire throttling of the pressure medium reflux, and thus the corresponding control of the cone disc transmission, occurs as a function of the power and the transmission ratio. Such a pressurizing valve may also be considered for use in the present invention.

In the case in which such transmissions are known to be used in motor vehicles, the problem of always ensuring the transition of the transmission ratio to the starting position independent of the respective driving conditions at the end or during an interruption of the driving is solved by special means provided there. This is especially the case with respect to emergency braking, because under normal driving conditions the time available and the quantity of pressure medium supplied by the pressure medium pump are sufficient to move the transmission into the start-up transmission gear. The start-up transmission ratio itself is characterized in that the pulling means at the driving-pulley assembly has the smallest travel radius and at the driven-pulley assembly it has the corresponding greatest travel radius.

However, a further problem occurs if the motor cannot be started due to a malfunctioning and the vehicle must be towed. In accordance with the start-up gear ratio, which exists in any case, the driving-pulley assembly is fully spread apart and must be towed along at high speed without the hydraulic tensioning means being supplied with pressure medium, because, if the engine is at rest, the pressure medium pump does not work either. The result may be permanent slipping and damage to the cone disc transmission, particularly if the drag moment at the drive is increased by additional devices, for example, a reversing gear including couplings.

SUMMARY OF THE INVENTION

Therefore, it is the object of the present invention to further develop a cone disc transmission of the type mentioned above such that even if the transmission drags in connection with an interrupted supply of pressure medium from the pump, the transmission is prevented from slipping through.

This object is attained according to the present invention, by having the pressure medium conduits leading from the control valve to the tensioning means connected to one another by means of a short-circuit conduit, and by having the short-circuit conduit open only when the pump is at rest.

Due to these inventive measures, it is not only possible, if the pump is at rest and the transmission is in tow, for pressure medium to escape from the tensioning means on the driven side, which, due to the current position of the control valve, would normally not be possible, but the escaping pressure medium may also be used directly for filling up the tensioning medium on the driving side. As a result, it is possible to adjust the transmission without the loss of pressure medium. In this case, the adjustment of the transmission occurs due to centrifugal forces of the pressure medium substances that circulate together with the tensioning means, and it is terminated when the pulley assemblies on the driving side and pulley assemblies on the driven side are running at approximately the same rotational speed, that is, the transmission ratio is in a range of 1:1. Since the effects of the centrifugal forces on the tensioning means are compensated by way of the pulling means, a certain emergency contact pressure is maintained for the latter.

The problem the invention addresses is thus solved with the help of particularly simple means without requiring any special measure or outside influence.

It is particularly advisable for configuring the invention that a pilot valve is arranged in the short-circuit conduit which, due to the influence of the pump pressure in the running pump, is in the closed position, and if the pump is at rest, it is in the open position.

In this case, it may be provided that the pilot valve is in a working relationship with a cylinder-piston unit which is charged with pump pressure. On account of this unit, the valve may be moved against the force of a stationarily supported spring into the closed position.

Another possibility is to arrange a pressure sensor in the pump pressure conduit from which the operation of the pilot valve may be derived.

In this case, the operation of the pilot valve by means of the pressure sensor may also be accomplished mechanically or electrically with the help of the available battery. However, preference is given to the first-mentioned solution, because operation of the drive assembly may fail precisely because the battery is empty.

BRIEF DESCRIPTION OF THE DRAWING

Further features and details of the invention are apparent from the following description of an exemplary embodiment illustrated in the sole drawing FIGURE, which is a schematic representation of the cone disc transmission according to the invention.

DETAILED DESCRIPTION OF THE PREFERRED EMBODIMENT

The sole drawing shows a drive assembly 1 in the form of an internal combustion engine from which a drive shaft 2 originates. The drive shaft 2 is in contact with the pulley assembly 3, 4 on the driving side of a cone disc transmission, which is provided on the other side with a pulley assembly 5, 6, on the driven side. The latter rotates on a driven shaft 7 to which the driving wheels (not illustrated) of a motor vehicle are attached. The two disc assemblies 3, 4 and 5, 6 are connected to one another by way of rotating pulling means 8. On each shaft 2, 7, one of the cone discs, namely, cone disc 3 and 5, respectively, are axially displaceable for changing the transmission ratio. For this purpose, the disc is configured in a known manner as cylinder jacket 9, 10 of a hydraulic pressure cylinder, whose piston 11 is fixed to the shaft.

Thus, a hydraulic tensioning means is formed at each of the axially displaceable cone discs 3, 5 to which pressure medium is supplied by way of a four-way control valve 12. To this end, a pressure medium pump 13 is provided on drive shaft 2. This pump sucks pressure medium from a reservoir 14 and takes it via a conduit 15 to the control valve 12 from where, depending on the switch position of the control valve, it is then fed via conduits 16, 17 to the hydraulic tensioning means on both sides of the transmission.

The pressure medium flowing from the control valve 12 is guided by way of a conduit 18 to a torque sensor 19, which is connected to the input of the cone disc transmission on the drive shaft 2. The pressure medium exits without pressure downstream of torque sensor 19 into reservoir 14. At its inlet, namely, conduit 18, the torque sensor 19 maintains torque-dependent pressure and determines the basic pressure of the hydraulic system controlling the cone disc transmission, such that a flawless transmission of force may be ensured at the cone disc transmission in that the basic pressure corresponds to the minimum pressure for the tensioning means.

The torque sensor 19 may be configured in a known manner, such that during torque surges a predetermined quantity of pressure medium is pumped back into conduit 18 in order to accommodate in this manner the sudden demand for pressure medium required to buffer the torque surges on the cone discs, which are axially adjustable on the driving and driven sides, of the cone disc transmission.

A pressure limiting valve 20, which serves as a safety valve and normally does not respond, is connected to the pressure medium supply by way of conduit 15.

Adjustment of the cone disc transmission ratio as a function of the performance of drive unit 1 and road resistance is accomplished with the help of a rotational revolution sensor 21, which is connected on drive shaft 2 at the input of the transmission. This sensor is supplied by way of a branch 22 of conduit 16, which charges the driving side of the transmission with pressure medium, and the sensor directs a pressure, which is a function of the rotational speed, to a spring-charged control element 24 in the form of a cylinder-piston unit, such that the axial position of the piston 25 reflects the rpm of the drive. By way of its piston rod 26, the piston 25 is hinged to one end of a lever 27, whose other end engages in an articulated manner with an angle lever 28. This angle lever is mounted permanently to the housing at 29, and it scans with its other end 30 a radial cam 31 which rests stationarily fixed at the end of a rod assembly 33, 34, which is activated by an operating lever 36, a so-called gas pedal, which is permanently mounted at 35, and which, by way of the free end 37 of the gas pedal and a connection 38, effects a power adjustment (not shown in detail) in drive unit 1, for example, the influence on the throttle valve of an internal combustion engine.

Control valve 12 scans the center of the lever 27 against the action of a spring 40 by way of a pin 39. A change in the position of the gas pedal 36 causes the lower end of the lever 27, and thus control valve 12, to deflect. The resulting change process at the cone disc transmission terminates when the driving rpm have changed such that the deflection of the control valve 12 is rectified again by way of the revolution sensor 21 and the resulting adjustment of the piston 25 at the upper end of the lever 27.

A predetermined number of revolutions thus corresponds to each adjustment of the gas pedal 36. Both values are associated with one another by the configuration of the radial cam 31.

Finally, a mechanical clutch 41 and a reversing gear 42 are arranged in the usual manner on the drive shaft 2.

If the actuating lever 36, i.e., the gas pedal, is moved into the neutral position for drive unit 1, the lowest desired number of revolutions which is clearly above the neutral rpm of the drive unit 1, is maintained. If the actual rpm now drops below this desired value, as is the case at the end of the ride when drive unit 1 is turned off, the result is a change of the cone disc transmission into the starting position in which the pulling means 8 in cone discs 3, 4 on the driving side assume the smallest travel radius. In this case, the piston of the control valve 24 moves to the left due to the reduced effect of the revolution sensor 21 in such a way that control valve 12 is able to conduct the stream of pressure medium coming via conduit 17 to the tensioning means of the disc pulley assembly 5, 6 on the driven side, resulting in the pulling means assuming the greatest travel radius.

If, on account of a defect, it is not possible at this time to start drive unit 1 again to resume driving and the vehicle must be towed away or towed in, the cone disc transmission is in the described starting position. This requires that during towing, due to the cone disc transmission being driven from the driven side, because of its transmission position, the set of discs 3, 4, on the driving side must rotate at the highest speed. However, since the pump 13 is not working either, no pressure from the pressure medium is available at tensioning means 9, 10, the transmission almost certainly slips through, which, during the towing process, results in permanent slipping through of the transmission and might result in serious damage to the transmission.

In order to prevent this, a short-circuit conduit 43, in which a pilot valve 44 is arranged, is provided between pressure medium conduits 16, 17 which supply tensioning means 9, 10. If pump 13 is working, a non-illustrated hydraulic actuating device puts this pilot valve under the influence of the pump pressure by way of a conduit 45 branched off from conduit 15. Thus the pilot valve is in the closed position with respect to short-circuit conduit 43 against the action of reset spring 46 that is fixed to and supported at the housing.

However, if the pump 13 is at rest, the pilot valve 44, under the influence of spring 46, moves into the open position for short-circuit conduit 43, as depicted in the drawing, such that tensioning means 9, 10 are hydraulically connected to one another. Now the pressure medium in the tensioning means 10 is able to exit, which would otherwise not be possible, since in the starting position mentioned above, the control valve 12 is in its position deflected to the left. However, the pressure medium which now exits tensioning means 10, is additionally able to reach tensioning means 9, such that an overall change in the transmission position of the cone disc transmission is possible.

This change in the setting of the transmission ratio of the cone disk transmission occurs in the towed vehicle in that, during the forced rotation of at least one disc pulley assembly—in the present case, that of disc pulley assembly 5, 6—the pressure medium present there is subject to centrifugal influences and is thus pressed against tensioning means 9 where it is able influence the mutual approach of the cone discs 3, 4.

This change in the transmission ratio, which occurs during towing on account of the influence of the force on the pressure medium, finds its equilibrium in the range of a transmission ratio of 1:1 in which disc pulley assemblies 3, 4 and 5, 6 rotate at approximately the same speed. However, since during this driving of the cone disc transmission resulting from the vehicle being towed, both disc assemblies are rotating at this time, the pressure medium on both sides is under the influence of the centrifugal force, which ensures a sufficient pressure acting on the pulling means 8 to prevent the transmission from slipping through, even if additional units have to be towed along by the transmission by way of drive shaft 2.

It will be understood that the above description of the present invention is susceptible to various modifications, changes an adaptations, and the same are intended to be comprehended within the meaning and range of equivalents of the appended claims.

What is claimed is:

1. In an infinitely adjustable cone disc transmission having a drive shaft, said transmission including the production of axial pressure forces of the cone discs on pulling means rotating between them via hydraulic tensioning means, which are arranged on the transmission shafts and each axially influence one of the displaceable cone disks arranged on the respective transmission shaft, the tensioning means having pressure medium conducts connected thereto and wherein, by way of a control valve, the tensioning means and the pressure medium conduits are charged with a pressure medium, which is supplied by a pump, and wherein, in the reflux of the control valve, a torque sensor is arranged on the drive shaft of the transmission, said transmission including two valve members disposed such that said sensor throttles the reflux of the pressure medium as a result of the torque-dependent movement of said two valve members relative to one another and as a function of the load, thereby determining the basic pressure of the transmission, and wherein an revolution sensor is provided on the drive shaft, which, as a function of the number of revolutions, provides pressure medium to a control element which, in connection with an adjustment member for drive power, acts upon the transmission ratio by way of the control valve, the improvement that pressure medium conduits leading from the control valve to the tensioning means are connected to one another by means of a short-circuit conduit and that the short-circuit conduit is open only if the pump is at rest.

2. A cone disc transmission as defined in claim 1, wherein a pilot valve is arranged in the short-circuit conduit and wherein, under the effect of the pump pressure, the pilot valve is in the closed position if the pump is running, and it is in the open position if the pump is at rest.

3. A cone disc transmission as defined in claim 2, wherein a pressure sensor from which the activation of the pilot valve may be derived is arranged in the pump pressure conduit.

4. A cone disc transmission as defined in claim 2, wherein the pilot valve interacts with a pump-pressure charged cylinder-piston unit by means of which said pilot valve may be moved into a closed position to counteract the effect of a stationarily supported spring.

* * * * *